Patented July 23, 1935

2,008,923

UNITED STATES PATENT OFFICE 2,008,923

CINCHONINIC ACID SALTS OF PIPERAZINES

Soli Ornstein, New York, N. Y., assignor of one-fourth to L. Graham Patmore, New York, N. Y.

No Drawing. Application July 9, 1931,
Serial No. 549,803

4 Claims. (Cl. 260—30)

This invention relates to pharmaceutical compounds comprising salts of phenyl cinchoninic acids and bases derived from ethylene diamine. These salts are of value in medicine in the treatment of arthritis, rheumatism and similar ailments.

Cinchophen, U. S. P., phenyl cinchoninic acid (2-phenyl-quinoline-4-carboxylic acid), has been used with varying results in the treatment of rheumatism, as has also dimethyl piperazine tartrate, the latter with even less success than the former. So far as I am aware, however, no salt of cinchophen and piperazine or other base derived from ethylene diamine has ever been prepared, nor have salts of substituted phenyl cinchoninic acids and the bases mentioned. I have found that these salts, particularly dimethyl piperazine phenyl cinchoninate, are exceedingly effective in the treatment of arthritis or rheumatism, the effectiveness of such salts far exceeding that of the compounds mentioned above as having been heretofore used.

Suitable acids, herein termed 2-phenyl cinchoninic acids, that may be used in preparing the salts of my invention, are:

(1) Cinchophen, 2-phenyl-quinoline-4-carboxylic acid.

(2) Methyl-phenyl cinchoninic acid, 6-methyl-2-phenyl-quinoline-4-carboxylic acid.

(3) Hydroxy-carboxy-phenyl cinchoninic acid, 2-(p-hydroxy-m-carboxy-phenyl)-quinoline-4-carboxylic acid, $C_{17}H_{11}NO_5$, the structural formula of which is

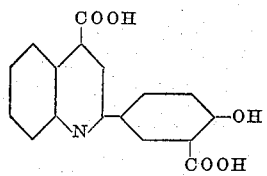

Suitable bases, herein generically termed piperazines, for preparing the salts of my invention are:

(1) Piperazine, $C_4H_{10}N_2$.

(2) Dimethyl piperazine, $C_6H_{14}N_2$.

It will be apparent that there are six possible combinations of the two acids and three bases mentioned above, as follows:

1. Piperazine 2-phenyl cinchoninate
2. Piperazine 6-methyl-2-phenyl cinchoninate
3. Piperazine 2-(p-hydroxy-m-carboxy-phenyl) cinchoninate
4. Dimethyl piperazine 2-phenyl cinchoninate
5. Dimethyl piperazine 6-methyl-2-phenyl cinchoninate
6. Dimethyl piperazine 2-(p-hydroxy-m-carboxy-phenyl) cinchoninate.

The manufacture of any of the possible salts of these acids and bases will be obvious to a skilled chemist from the few typical examples which I shall now proceed to give.

*Example 1.*—Manufacture of dimethyl piperazine phenyl cinchoninate. 2 mols of cinchophen are suspended in about 2 liters of water. Cinchophen is almost insoluble in cold water, and is wet only with difficulty by water. The suspension is therefore prepared by first grinding in a mortar and pestle with a small quantity of water to form a paste and then gradually diluting to form the suspension. If desired, alcohol or other suitable solvent may be substituted for the water. The mixture is then heated to boiling, a solution of slightly more than 1 mol, say 1.1 mol, of dimethyl piperazine in 250 c. c. of water is quickly added and the mixture stirred. The dimethyl piperazine is unstable and hence must be freshly prepared, either by direct synthesis or from a stable salt such as the commercial tartrate. The reaction occurs readily, and within a short time a white powder precipitates, composed of very minute crystals of dimethyl piperazine phenyl cinchoninate, comprising two molecules of cinchophen and one of dimethyl piperazine. The precipitate is then filtered off and dried. The resulting powder is very slightly soluble in water, soluble in hot alcohol, and easily soluble in dilute alkali or acid. It melts at 208 to 209° C. to a reddish liquid.

*Example 2.*—Manufacture of piperazine phenyl cinchoninate. This salt may be prepared exactly as in the preceding example, substituting piperazine for the dimethyl piperazine used in the preceding example, the base being used slightly in excess as before. The purpose of the excess base is to insure that all of the cinchophen enters into the reaction so that the resulting precipitate will not contain any appreciable quantity of unreacted cinchophen.

*Example 3.*—Manufacture of piperazine methyl-phenyl cinchoninate. 2 mols of 6-methyl-2-phenyl-quinoline-4-carboxylic acid are suspended in about 2 liters of water and the mixture heated to boiling as before. 1.1 mols of piperazine, dissolved in 250 c. c. of water, are added quickly, and the mixture stirred. A white powdery precipitate of fine crystals of piperazine 6-methyl-2-phenyl-quinoline-4-carboxylate is obtained. The structural formula of this reaction is as follows:

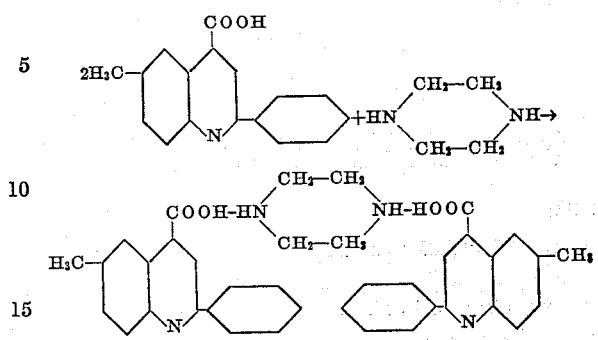

It will be understood that the foregoing examples are by way of illustration and not of limitation. Various changes may be made by those skilled in the art without departing from the spirit of my invention, and I desire to be limited, therefore, only by the prior art and the scope of the appended claims.

I claim:
1. A bis (2-phenyl cinchoninic acid) salt of a piperazine.
2. A bis (6-methyl-2-phenyl cinchoninic acid) salt of a piperazine.
3. Bis (2-phenyl cinchoninic acid) salt of 2'.6' dimethyl piperazine.
4. A bis [2-(p-hydroxy-m-carboxy-phenyl) cinchoninic acid] salt of a piperazine.

SOLI ORNSTEIN.